United States Patent
Takeyasu

(10) Patent No.: US 6,295,516 B1
(45) Date of Patent: Sep. 25, 2001

(54) DATA TRANSMISSION APPARATUS AND DATA TRANSMISSION SYSTEM

(75) Inventor: Masashi Takeyasu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/272,397

(22) Filed: Mar. 19, 1999

(30) Foreign Application Priority Data

Mar. 25, 1998 (JP) ................................. 10-076893

(51) Int. Cl.⁷ ................................................. G06F 17/50
(52) U.S. Cl. ............................ 703/13; 703/23; 370/229; 710/60
(58) Field of Search .............................. 703/13, 14, 19, 703/23; 710/60; 709/226; 370/229, 232

(56) References Cited

U.S. PATENT DOCUMENTS

| | | | |
|---|---|---|---|
| 5,726,977 | * 3/1998 | Lee ....................................... | 370/238 |
| 5,870,589 | * 2/1999 | Alexander, Jr. et al. .............. | 703/23 |
| 5,884,064 | * 3/1999 | Rosenberg ............................. | 703/27 |
| 5,983,261 | * 11/1999 | Riddle .................................. | 709/226 |
| 6,016,311 | * 1/2000 | Gilbert et al. ........................ | 370/280 |
| 6,078,958 | * 7/2000 | Echeita et al. ........................ | 709/226 |

OTHER PUBLICATIONS

Lee et al., "A Bandwidth Reallocation Scheme for Ethernet–Based Real Time Communication", Proc. Second Intern. Workshop on Real–Time Computing Systems and App., pp. 28–33, Oct. 1995.*

Zhao et al., "Optimal Bandwidth/Delay Tradeoff for Feasible–Region–Based Scalable Multimedia Scheduling", Proc. IEEE INFOCOM '98, vol. 3, pp. 1131–1138, Apr. 1998.*

Zheng et al., "Synchronous Bandwidth Allocation in FDDI Networks", IEEE Transactions on Parallel and Distributed Systems, vol. 6, Issue 12, pp. 1332–1338, Dec. 1995.*

Lin et al., "QoS Routing in ad hoc Wireless Networks", Proc. 23rd Annual Conf. on Local Computer Networks, pp. 31–40, Oct. 1998.*

* cited by examiner

*Primary Examiner*—Kevin J. Teska
*Assistant Examiner*—Douglas W. Sergent
(74) *Attorney, Agent, or Firm*—Jay H. Maioli

(57) ABSTRACT

A data transmission apparatus and a data transmission system, and more particularly, a data transmission apparatus which includes a detection unit for detecting a bandwidth of data transmission actually used in a transmission line, a calculation unit for calculating a bandwidth required for transmission of data to be transmitted, and a requesting means for requesting, when the bandwidth of data transmission actually used in the transmission line varies, a management apparatus for the transmission line to set a bandwidth in the transmission line in response to the bandwidth calculated by the calculation means.

2 Claims, 3 Drawing Sheets

DATA TRANSMISSION APPARATUS AND DATA TRANSMISSION SYSTEM

BACKGROUND OF THE INVENTION

This invention relates to a data transmission apparatus and a data transmission system, and more particularly to a data transmission apparatus suitable for use for transmission of audio visual data for which a protocol of the IEEE (Institute of Electrical and Electronics Engineers) 1394 High Performance Serial Bus Standards (hereinafter referred to as IEEE 1394 serial bus) is used.

It is highly anticipated that the IEEE 1394 serial bus will be spread widely in the future as a digital interface for connection between a world of digital audio visual apparatuses and a world of a personal computers. The reason why such high anticipation is directed to the IEEE 1394 serial bus is that it has such significant characteristics as given below. In particular, while a related art audio visual apparatus (hereafter referred to as AV apparatus) normally employs a DS link wherein data transmission is performed by two-value difference driving, the IEEE 1394 serial bus realizes three-value difference driving at a high data transfer rate of 100, 200, 400 Mbps by simultaneous driving of two nodes linked to each other by a shielded 6-pin cable including a twisted line and a power supply line in a pair.

Where the IEEE 1394 bus is used to communicate audio digital data (hereinafter referred to as AV data) between two arbitrary nodes, communication data are divided into packets and transmitted in time division in cycles of the interval of 125 $\mu$s. More particularly, isochronous communication in which an isochronous packet is used and asynchronous communication in which an asynchronous packet is used are performed suitably. AV data are transmitted basically with isochronous packets. For example, two nodes which intend to communicate AV data using isochronous communication access, in order to secure a data transmission band for the isochronous communication when they act as a transmitter and a receiver, utilize a predetermined address of a node (hereinafter referred to as route), which serves also as a management apparatus of a transmission line, by asynchronous communication in a time band which remains in each cycle and is not used for data transmission of isochronous communication to request for a bandwidth (channel) to be used for the isochronous communication.

In response to the request, the route performs arbitration (allocation of a bandwidth) and provides an isochronous reference (hereinafter referred to as IR) issued from an isochronous resource manager (hereinafter referred to as IRM) built therein to each of the nodes successively beginning with the node to which the route has assured a bandwidth for communication. Each of the nodes on the IEEE 1394 serial bus performs isochronous communication with the IR supplied thereto and consequently can transmit or receive AV data connected thereto to or from the other node. After the communication of AV data is completed, each of the nodes returns its IR to the IRM of the route.

According to the transmission system described above, however, also when a codec has a variable compression ratio of transmission data such as a wavelet transform codec used to transmit AV data in accordance with an image compression/decompression protocol having a variable transmission bandwidth, AV data are transmitted by isochronous communication corresponding to the fixed used bandwidth determined by the IRM upon establishment of connection between the nodes. Consequently, the related art transmission system described above has a subject to be solved in that, even when the occupied bandwidth of the bus varies during the communication of AV data and a greater margin appears with the bandwidth of the transmission line or the margin of the bandwidth of the transmission line disappears, it is difficult to suitably vary the transmission bit rate of transmission data in response to the variation of the occupied bandwidth of the bus.

SUMMARY OF THE INVENTION

It is an object of the present invention to provide a data transmission apparatus and a data transmission system which allow transmission of data with a higher efficiency.

In order to attain the object described above, according to the present invention, each node suitably varies its setting of a bandwidth to be used for isochronous communication in response to a variation of a bandwidth.

In particular, according to an aspect of the present invention, there is provided a data transmission apparatus for communicating data with a variable transmission bandwidth over a data transmission line, including a detection means for detecting a bandwidth of data transmission actually used in the transmission line, a calculation means for calculating a bandwidth required for transmission of data to be transmitted and a requesting means for requesting, when the bandwidth of data transmission actually used in the transmission line varies, a management apparatus for the transmission line to set a bandwidth in the transmission line in response to the bandwidth calculated by the calculation means.

According to another aspect of the present invention, there is provided a data transmission system comprising a first data transmission apparatus including a detection means for detecting a bandwidth of data transmission actually used in a data transmission line, a calculation means for calculating a bandwidth required for the data transmission, and a requesting means for requesting, when the bandwidth of data transmission actually used in the transmission line varies, a management apparatus for the transmission line to set a bandwidth in the transmission line in response to the bandwidth calculated by the calculation means, and a second data transmission apparatus for communicating data with the first data transmission apparatus over the data transmission line, wherein the first data transmission apparatus controls the calculation means to calculate a bandwidth required for data transmission with the second data transmission apparatus and requests, when the bandwidth of the data transmission line actually used varies, the management apparatus to set a bandwidth of the transmission line connected to the second data transmission apparatus in response to the bandwidth calculated by the calculation means.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Before a preferred embodiment of the present invention is described, in order to make clear a corresponding relationship between various features recited in the claims and elements of the embodiment of the present invention described below, the features of the present invention are described below together with the corresponding elements to which reference symbols denoting them are added in parentheses. However, this description provides a mere example and does not signify that the features of the present invention be limited to the recited elements.

According to an aspect of the present invention, there is provided a data transmission apparatus which includes a detection means (for example, step S1 of FIG. 3) for detecting a bandwidth of data transmission actually used in a transmission line, a calculation means (for example, step S8 of FIG. 3) for calculating a bandwidth required for transmission of data to be transmitted, and a requesting means (for example, step S9 of FIG. 3) for requesting, when the bandwidth of data transmission actually used in the transmission line varies, a management apparatus for the transmission line to set a bandwidth in the transmission line in response to the bandwidth calculated by the calculation means.

Figure 1:
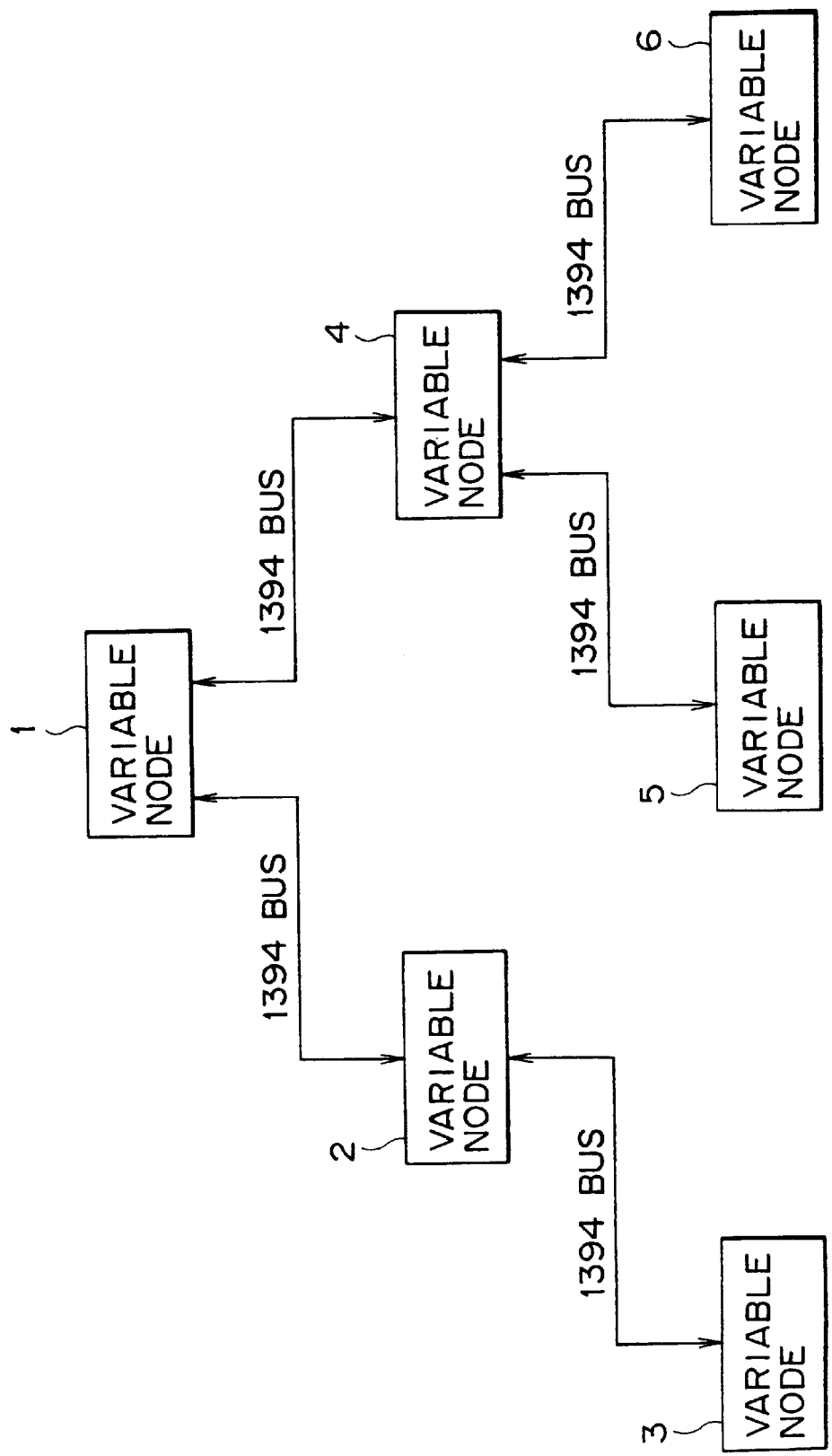
FIG. 1 is a block diagram showing an example of a construction of a data transmission system to which a data transmission apparatus of the present invention is applied.

FIG. 1 shows a construction of a data transmission system to which a data transmission apparatus of the present invention is applied. It is to be noted that, in the present specification, the term "system" is used to describe a general apparatus including a plurality of apparatuses, means and so forth. Referring to FIG. 1, the data transmission system includes variable nodes or data transmission apparatuses 1 to 6 each including a codec not shown of a variable bit rate and connected to each other using the IEEE 1394 serial bus (hereinafter referred to as 1394 bus) as shown in FIG. 1 so that each of the variable nodes 1 to 6 can communicate data with any other variable node on the 1394 bus of FIG. 1. In the 1394 bus system shown in FIG. 1, the variable node 6 serves as a route and has an additional function of an IRM. Thus, the variable node 6 manages occupied band information of all of the 1394 bus of FIG. 1, and performs arbitration in response to a request for use of a bandwidth from any of the variable nodes 1 to 5 and supplies an IR.

Figure 2:
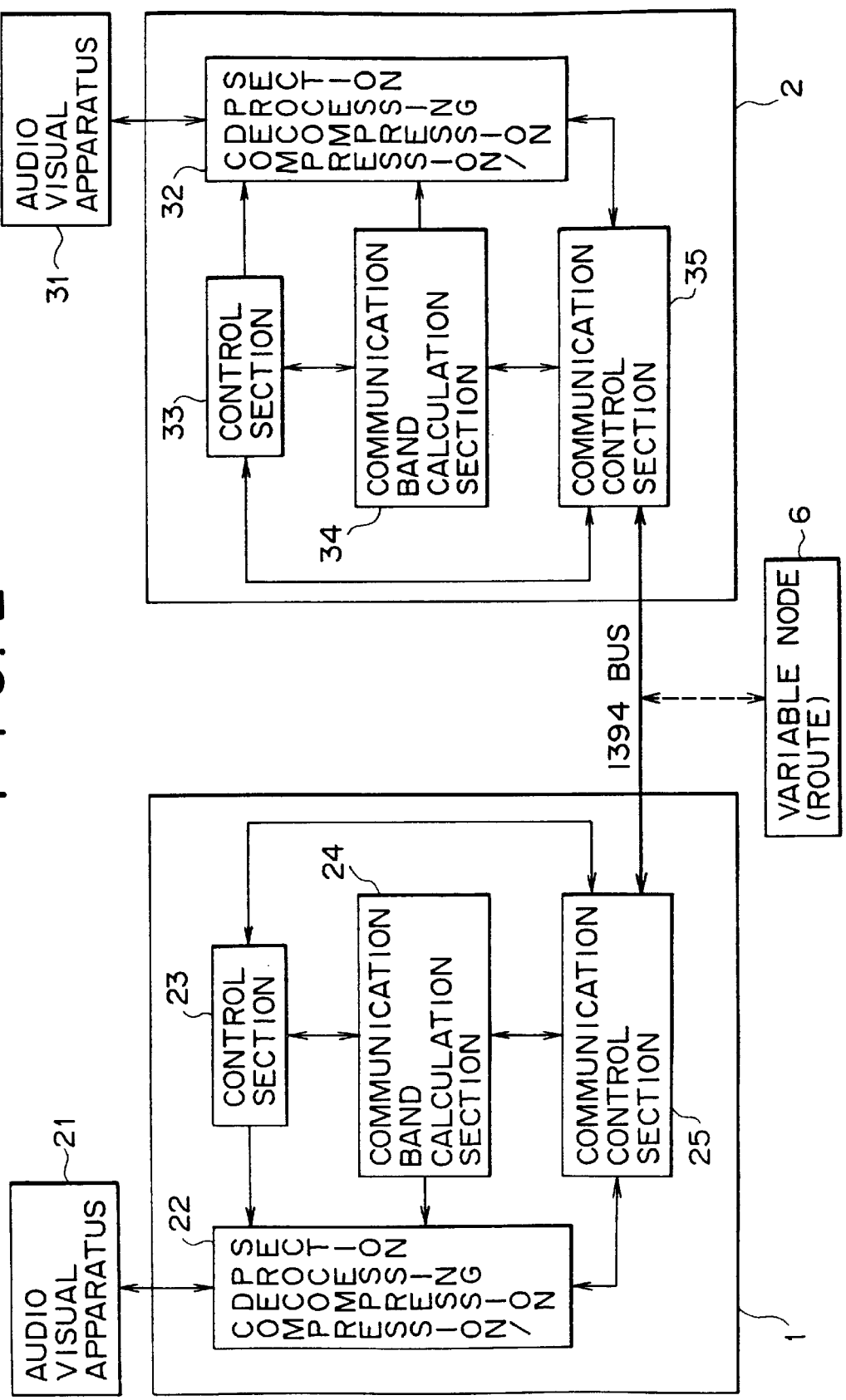
FIG. 2 is a block diagram showing an example of internal constructions of variable nodes shown in FIG. 1.

FIG. 2 shows an example of an internal construction of the variable nodes 1 and 2. It is to be noted that the variable nodes 3 to 5 have a similar construction. Referring to FIG. 2, a compression/decompression processing section 22 of the variable node 1 communicates AV data with an audio visual (AV) apparatus 21 and compresses/decompresses received data. A control section 23 of the variable node 1 controls entire operation of the variable node 1 in accordance with a predetermined computer program stored therein in response to, for example, an operation of a remote commander. A communication band calculation section 24 calculates a bandwidth which can be used for transmission of AV data over a transmission line of the 1394 bus. A communication control section 25 communicates various data with any other node over the 1394 bus.

The variable node 2 is constructed similarly to the variable node 1 and includes a compression/decompression processing section 32, a control section 33, a communication band calculation section 34 and a communication control section 35 which execute similar processes to those of the compression/decompression processing section 22, the control section 23, the communication band calculation section 24 and the communication control section 25, respectively, of the variable node 1 for AV data to be transmitted or received by the AV apparatus 31 in response to, for example, an operation of a remote commander or a like apparatus.

A control section not shown of the variable node 6 (route) includes an IRM not shown which supplies an IR in response to a request by asynchronous communication from the communication control section of any of the variable nodes 1 to 5 thereby to control isochronous communication over the 1394 bus. The remaining part of the variable node 6 (route) is constructed similarly to the variable nodes 1 and 2.

Accordingly, in FIG. 2, the variable node 6 (route) supplies an IR in response to a request by asynchronous communication from the communication control section 35 of variable node 1 or 2 to thereby control isochronous communication on the 1394 bus.

It is to be noted that, while the following description proceeds on the assumption that the variable node 1 acts as a transmission node and the variable node 2 acts as a reception node for the convenience of description, naturally the variable node 1 may act as a reception node while the variable node 2 acts as a transmission node.

Figure 3:
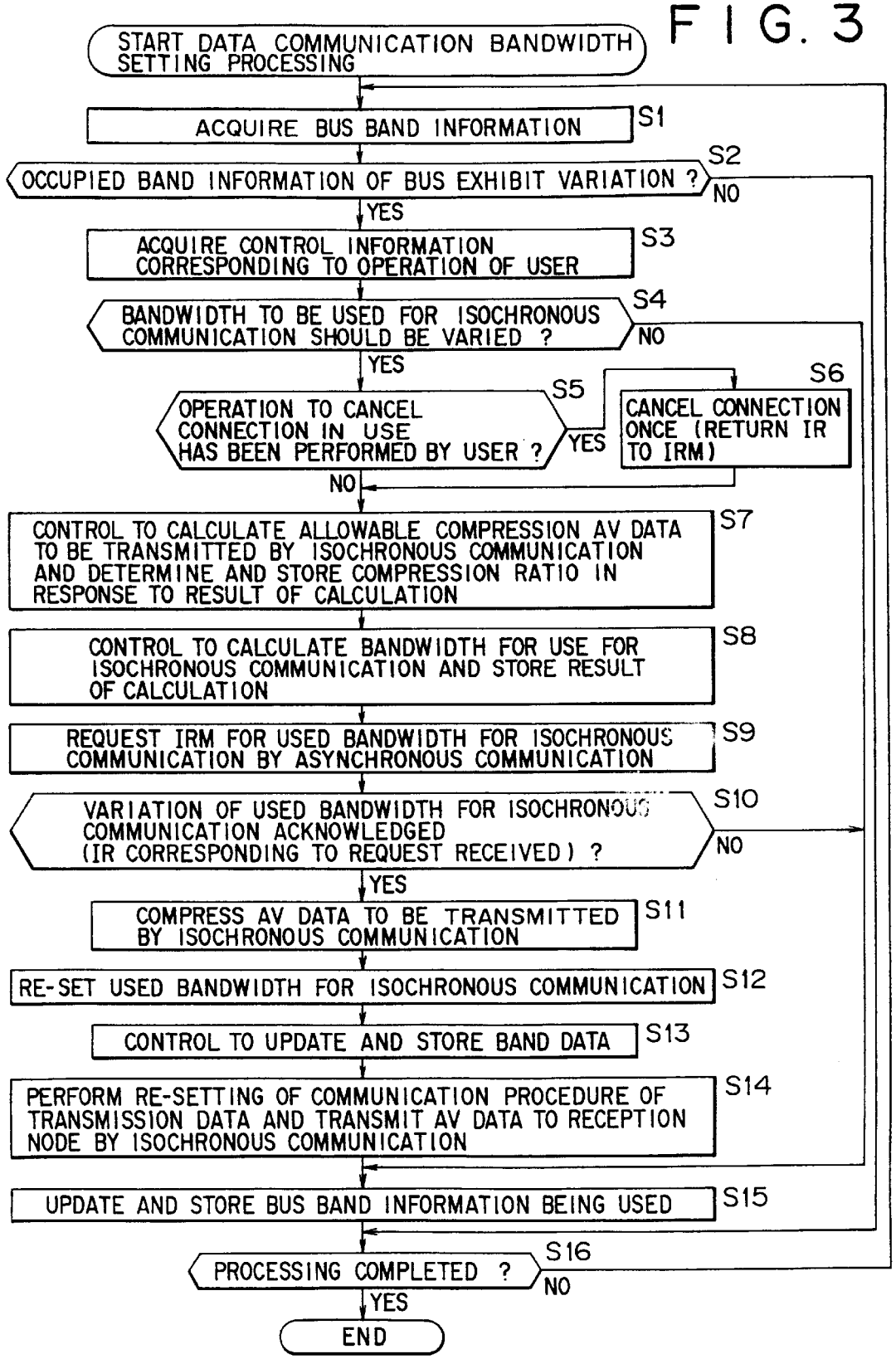
FIG. 3 is a flowchart illustrating a process for setting an AV data communication bandwidth by a controller shown in FIG. 2.

Subsequently, processing of setting of a communication bandwidth for AV data by the control section 23 of the variable node 1 is described with reference to FIG. 3. After the setting processing for a data transmission bandwidth for AV data is started, first in step S1, the control section 23 of the variable node 1 controls the communication control section 25 to monitor (receive) IRs of other nodes on the 1394 bus to thereby detect bus band information. The control section 23 discriminates, in step S2, based on the detected bus band information whether or not the occupied bandwidth of the bus exhibits a variation from its preceding value stored in the communication band calculation section 24 (the storage processing is hereinafter described in connection with step S15) in response to a variation of the communication condition of any other node. If the control section 23 discriminates that the occupied bandwidth of the bus exhibits a variation, the control advances to step S3, in which the control section 23 receives a signal corresponding to some inputting operation carried out by a suitable operation section such as, for example, a remote commander by a user and extracts (acquires) control information included in the received signal such as, for example, information regarding when the used band of the 1394 bus exhibits a variation, whether or not the bandwidth to be used by the self apparatus should be varied and, when the bandwidth should be varied, whether or not the isochronous communication should be cancelled.

The control section 23 of the variable node 1 then discriminates in step S4 whether or not the instruction of the user acquired in step S3 requires variation of the bandwidth to be used for transmission/reception of AV data by isochronous communication in response to the total bandwidth data which can be used for isochronous communication. If the control section 23 discriminates that the instruction requires variation of the bandwidth to be used for transmission/reception of AV data by isochronous communication, the control advances to step S5, in which the control section 23 discriminates whether or not the control information from the user supplied thereto in step S3 includes an instruction to cancel the connection being currently used, that is, whether or not an operation to cancel the connection being currently used has been performed. If the control section 23 discriminates that the connection should be cancelled once, then the control advances to step S6, in which the control section 23 controls the communication control section 25 to return the IR being currently used to the variable node 6 (route) to temporary cancel the connection being currently used.

After the processing in step S6 is completed, or when it is discriminated in step S5 that it is not instructed to cancel the connection, the control advances to step S7, in which the control section 23 of the variable node 1 controls the communication band calculation section 24 to calculate a compression ratio at which the AV data to be transmitted by isochronous communication can be transmitted, such as, for example, a maximum bit rate at which transmission data of an image is not damaged at all, and determine and store a compression ratio of the transmission data in accordance with a result of the calculation. The control section 23 controls, in step S8, the communication band calculation section 24 in response to the compression ratio to calculate a used bandwidth for isochronous communication and store a result of the calculation. The control section 23 controls, in step S9, the communication control section 25 to perform asynchronous communication with the IRM of the variable node 6 (route) to request it to vary the bandwidth being currently used for the isochronous communication in accordance with the result of communication of step S8.

The control section 23 of the variable node 1 discriminates, in step S10, whether or not the variation of the used bandwidth has been acknowledged, that is, whether or not an IR corresponding to the request has been received from the IRM of the variable node 6 (route). If it is discriminated that the variation of the bandwidth to be used for isochronous communication has been acknowledged, then the control advances to step S11, in which the control section 23 controls the compression/decompression processing section 22 to compress the AV data to be transmitted at the compression ratio determined in step S7. Then, the control section 23 re-sets, in step S12, the communication bandwidth for isochronous communication of the transmission data to the communication bandwidth acknowledged in step S10.

After completion of the processing in step S12, the control section 23 of the variable node 1 advances its control to step S13, in which it updates and stores the bandwidth data of isochronous communication stored in the communication band calculation section 24 in response to a result of the re-setting. The control section 23 controls, in step S14, the communication control section 25 to perform re-setting of the communication procedure for isochronous communication of the transmission AV data described above with the communication control section 35 of the variable node 2, which serves as a reception node, in accordance with the band data updated in step S13 and transmit the AV data to the communication control section 35 of the variable node 2 by isochronous communication.

If it is discriminated in step S4 that the bandwidth to be used for isochronous communication should not be updated, or if it is discriminated in step S10 that the variation of the used bandwidth for isochronous communication has not been acknowledged, that is, an IR corresponding to the request has not been received from IRM of the variable nodes 6 (route), or otherwise when the processing in step S14 is completed, the control advances to step S15, in which the control section 23 controls the communication band calculation section 24 to update and store the bus band information being currently used.

After completion of the processing in step S15 or if it is discriminated in step S2 that the occupied bandwidth of the bus does not exhibit a variation, the control advances to step S16, in which the control section 23 discriminates whether or not the processing is completed. If the control section 23 discriminates that the processing is not completed as yet, it returns its control to step S1 to repeat the processing in the steps described above from step S1. On the contrary, if the control section 23 discriminates that the processing is completed, it ends the processing.

It is to be noted that, while, in the embodiment described above, the variable node 6 has an IRM function, it is otherwise possible that not the variable node 6 but the control section 23 of the variable node 1 has an additional function of an IRM.

While a preferred embodiment of the present invention has been described using specific terms, such description is for illustrative purpose only, and it is to be understood that changes and variations may be made without departing from the spirit or scope of the invention.

What is claimed is:

1. A data transmission apparatus for transmitting data over a data transmission line having a predetermined transmission bandwidth, said apparatus comprising:
   a management apparatus for said transmission line;
   a control section receiving from a user an input operation signal and for detecting whether the bandwidth to be used for data transmission requested by the operation signal requires variation by discriminating the bandwidth to be used and a preceding value of bandwidth;
   calculation means controlled by said control section for calculating a used transmission bandwidth required for transmission of the data and for storing the preceding value of bandwidth used by said control section in said discriminating; and
   communication control means for requesting said management apparatus for said transmission line to vary said data transmission bandwidth in said transmission line in response to said transmission bandwidth calculated by said calculation means.

2. A data transmission system comprising:
   a management apparatus for a data transmission line;
   a first data transmission apparatus for transmission of data with said first data transmission apparatus over the data transmission line, wherein
   said first data transmission apparatus includes:
   a control section receiving from a user an input operation signal and for detecting whether the bandwidth to be used for data transmission requested by the operation signal requires variation by discriminating the bandwidth to be used and a preceding value of bandwidth;
   calculation means controlled by said control section for calculating a used transmission bandwidth required for transmission of the data and for storing the preceding value of bandwidth used by said control section in said discriminating; and
   communication control means for requesting said management apparatus for said transmission line to vary said data transmission bandwidth in said transmission line in response to said bandwidth calculated by said calculation means; and
   said first data transmission apparatus communicates with said second data transmission apparatus over said transmission line having said bandwidth calculated by said calculation means and set by said management apparatus.

* * * * *